No. 891,473.

PATENTED JUNE 23, 1908.

G. A. FOWLER.
TUNNEL DRIVING MACHINE.
APPLICATION FILED JULY 30, 1907.

WITNESSES:

INVENTOR
George Allen Fowler
BY
Edward L. Shannon
ATTORNEY

No. 891,473.

G. A. FOWLER.
TUNNEL DRIVING MACHINE.
APPLICATION FILED JULY 30, 1907.

PATENTED JUNE 23, 1908.

WITNESSES:

INVENTOR
George Allen Fowler
BY
Edward L. Shannon
ATTORNEY

No. 891,473. PATENTED JUNE 23, 1908.
G. A. FOWLER.
TUNNEL DRIVING MACHINE.
APPLICATION FILED JULY 30, 1907.

WITNESSES:
George L. Fulger
Ernest A. Samuelson

INVENTOR
George Allen Fowler
BY
Edward L. Shannon
ATTORNEY

UNITED STATES PATENT OFFICE.

GEORGE ALLEN FOWLER, OF GEORGETOWN, COLORADO, ASSIGNOR OF ONE-HALF TO EDWARD J. WILCOX, OF DENVER, COLORADO, AND ONE-FOURTH TO FRANK V. GOETZ, OF CLEAR CREEK COUNTY, COLORADO.

TUNNEL-DRIVING MACHINE.

No. 891,473.　　　　Specification of Letters Patent.　　　Patented June 23, 1908.

Application filed July 30, 1907. Serial No. 386,179.

*To all whom it may concern:*

Be it known that I, GEORGE ALLEN FOWLER, a citizen of the United States, residing at Georgetown, in the county of Clear Creek and State of Colorado, have invented a new and useful Tunnel Driving or Cutting Machine, of which the following is a specification.

My invention is directed to the production of a pneumatic mining machine, having a plurality of thrust actuated drills adapted particularly for tunneling or driving operations and in which the drills are carried by a pivotally mounted block which, in its cutting operation, is automatically caused to travel back and forth reducing the wall of the breast in the arc of a circle for giving a clearance at the sides of the machine; and in which the extent of such travel is automatically determined, and in connection with the arrangement of the drills at the top and at the bottom of the block and the oscillation of the block provide thereby a clearance for the advance of the car at its sides, at its top and at its bottom in cutting its way in forming the tunnel.

Thrusting drills disposed in the block and caused to be actuated in groups which alternate in striking a thrusting blow, is a feature of my invention. For mounting this drill-block a car is provided with means whereby it is advanced and held during the driving operations of the drills; and in the claims appended hereto I will set out the parts and combinations of parts wherein my invention resides in connection with the accompanying drawings in which

Herein I have used the terms major and minor channels in the drill-block, the major channels being those in the end section of the block and which are connected with the air compressor; while the minor channels are the vertical channels near the front of the drill-block, which are, by horizontal passages, connected to the major channels.

1 indicates a car having at its rear end a driven axle 8, journaled in bearings and carrying traction wheels 2, which, in connection with wheels 40 journaled in bearings at the forward end of the car, form a rolling support for the car.

Figure 19:
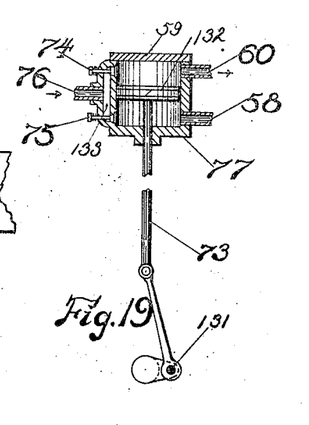
Fig. 19 is an enlarged vertical sectional view of the air compressor showing its valved ports and piston-rod operating connections and connection for supplying compressed air thereto to the compressor, and the provision whereby the compressed air is caused to effect the reciprocation of the drills.

An air compressor 59, is carried by the car and consists of a cylinder 77, having a reciprocatory piston 132 therein, its piston-rod 73, being connected by a pitman, to a crank 131, the shaft of which carries at its outer end a belt-pulley 57, to which power for reciprocating the piston 132 is applied.

An air chamber 133, formed on the exterior of the cylinder, communicates with the interior thereof by ports located on each side of the piston, the upper port being controlled by a valve 74 and the lower port by a valve 75, the valves opening inwardly into the cylinder against the force of their springs. The air chamber 133 is in communication by means of a pipe 76, with a compressed air supply which maintains a practically unvarying pressure in the chamber 133. Opposite this chamber the cylinder is provided with openings, one at each side of the piston, the upper opening having a hose or pipe 60 connected therewith, and the lower opening a hose or pipe 58, both connecting with the drill-block. In this description of the source and use of the compressed air as the power for operating the drills, it will be understood that the pipe 76, leads to the source of such power and that from this source the air is received and delivered from a compressing and expanding machine 59, the function of which is to compress and distribute the air therefrom into the chambers of the drill-block and which will hereinafter be designated the "air compressor and distributer."

Figure 1:
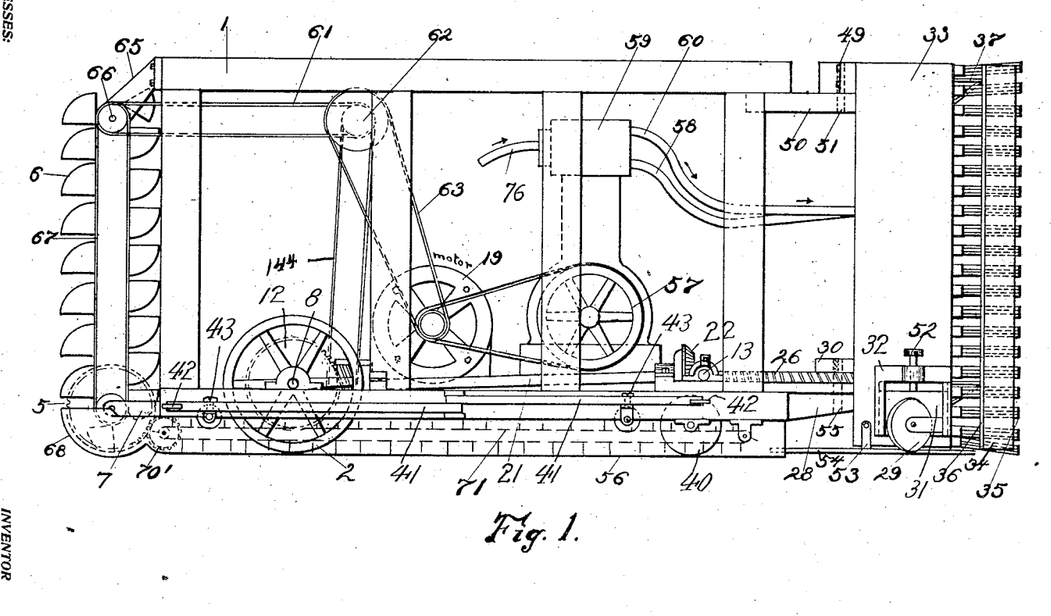
Figure 1 represents in side elevation a rock tunneling or driving machine embodying my invention and in which a swing drill-block having a multiple of drills, is mounted upon wheels and the drills are adapted to be actuated by pneumatic power thrusting hammers, and means whereby the drill-block is caused to be turned to the right or to the left as it is moved forward against the breast.

Upper and lower horizontal brackets 50 and 28 respectively are rigidly secured to and project from the front end of the car. These brackets pivotally support a drill-block 33, having an upper bearing 49, Fig. 1, which rests upon the car bracket 50, and is pivoted thereto by a stud 51, said block having also a lower bearing 30, superimposed upon a segmental worm wheel 26 rigidly secured to the drill-block and resting upon the car bracket 28. A pivot pin 55, in vertical alinement with the pivot pin 51, depends from the bracket 30, and passes through the center of worm segment 26, and the lower bearing 28.

The drill-block 33, is formed preferably of three vertical sections 146, 147 and 148, which are firmly connected together side by side.

Each section is provided with a plurality of cylindrical drill-chambers all of which, excepting the uppermost and lowermost ones, are horizontally disposed, the excepted ones being inclined outwardly to the face of the block for a purpose hereinafter stated.

Each chamber is composed of a front portion 139 and a rear portion 134, of lesser diameter than the front portion, all of the chambers in a section being preferably in vertical alinement therein; the chambers in the outer sections being in horizontal alinement, and each chamber in the middle section being below the horizontal plane connecting a chamber in one of the outer sections which is in horizontal alinement with a chamber in the other outer section. A drill carrying chuck 38, and its actuating hammer or piston 84, are seated in each chamber, the chuck having a head adapted to be reciprocated in the front portion 139, the shank of the chuck working through an opening in a screw threaded plug 78 which closes the front end of the chamber, and the hammer being adapted to be reciprocated in the portion 134, the forward movement of the hammer resulting in the thrusting blow of its drill.

The drill-block is provided with major vertical channels 86 and 88, and minor vertical channels 79, and 81. The major and minor channels extend continuously throughout a sufficient portion of the length of the drill-block to accommodate all of the chambers therein, these channels being inclosed by the drill-block except at the outlets hereinafter indicated.

Figures 5, 6, 7, 8:
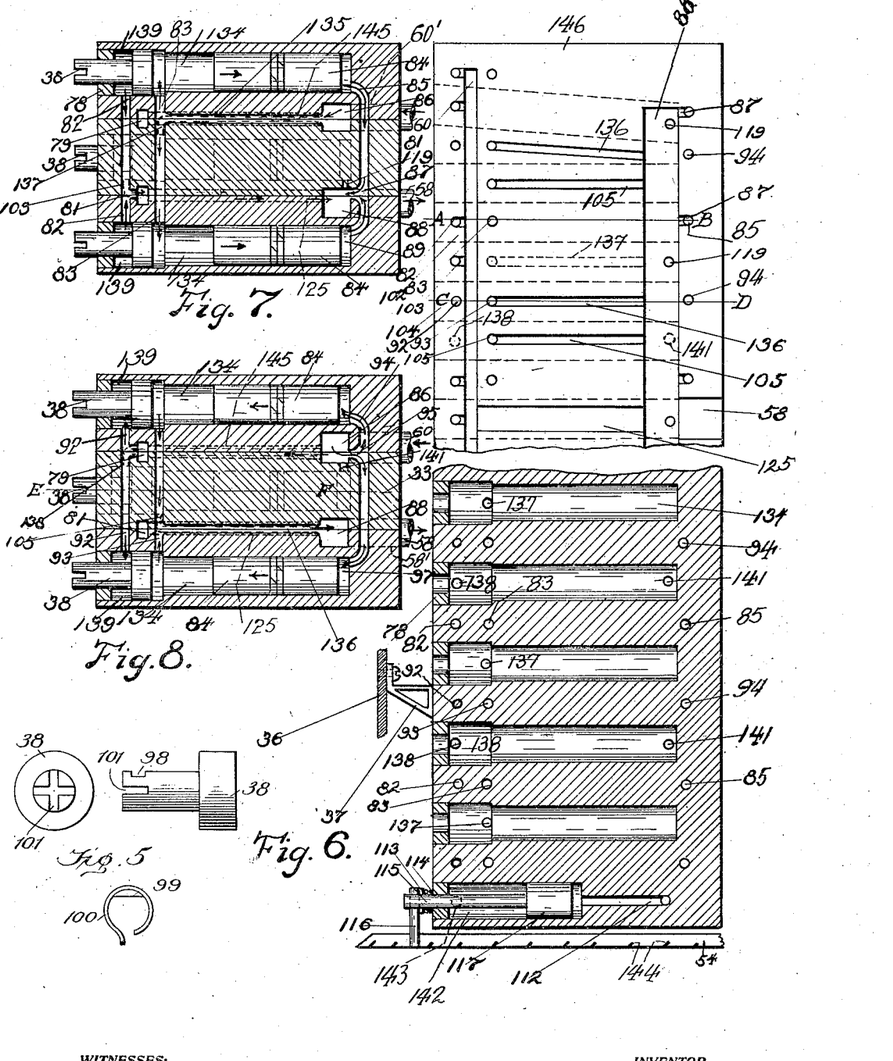
Fig. 5 shows an enlarged view of the drill chuck-head and the key for securing the drill-bit therein.
Fig. 6 shows enlarged in vertical central section the lower half part of the swing drill-block taken on the line E—F of Fig. 8, the drill-chucks and their hammers being removed to expose their receiving chambers, the upper half part of said block being shown in side elevation running through the interior air passage 88 of Fig. 8.
Fig. 7 is an enlarged horizontal section taken on the line A—B of Figs. 4 and 6 showing hammers in elevation and the relation of the side hammers and the drill chuck-heads to the air ports and passages by which the hammers are actuated.
Fig. 8 is a horizontal section taken on the line C—D of Figs. 4 and 6, but showing the side hammers in elevation and their relation to some of the ports and passages the reverse of that shown in Fig. 7.

The minor channel 79 is connected to the major channel 86 by a horizontal passage 145 shown in dotted lines in Figs. 7 and 8; and channel 81 is connected to channel 88 by a horizontal channel 125 similar to channel 145, and shown in dotted lines in Figs. 7 and 8, and in full lines in Fig. 6. The channels 86 and 88 communicate respectively with the exterior of the block by horizontal openings 60' and 58', the former being connected to the hose or pipe 60, and the latter to the hose or pipe 58 leading from the cylinder of the compressor. The drills are actuated in groups which alternate in striking a blow, and for this reason three drills constitute a transverse group, composed of a drill in one of the outer sections, the alining drill in the other outer section, and the drill in the middle section below the horizontal plane of the first two drills. These transverse groups are repeated vertically throughout the block, the first, third, fifth, etc., transverse groups striking a blow, under the impulse of the forward movement of their actuating hammers, while the second, fourth, sixth, etc., groups of actuating hammers are moving backward to their initial position. Thus one half of the number of drills of the block are struck by their hammers to drive them into contact with the wall, at the same time that the other half of the number of hammers are returning to their initial position. To accomplish this result, the successive transverse groups are connected to the major channels 86 and 88, in a manner to be now indicated.

Referring to Figs. 7 and 8, which are taken on different horizontal planes, the plane of Fig. 7, being above that of Fig. 8, and each figure therefore representing successive transverse groups of hammers and chucks, the middle hammer and chuck of each group being shown in dotted lines, it will be seen that each drill-chamber is connected at its back end, at the rear of the piston, to a major vertical channel; that it is connected at its front end in front of the chuck-head by means of a transverse passage, a minor vertical channel, and a horizontal channel, to the same major channel; and that said chamber is connected at a point at the rear of the chuck-head and in front of the hammer to the other major channel. Therefore, when air is compressed in the first mentioned major channel it drives the hammer forward against the chuck-head, and simultaneously compressed air is admitted in front of the chuck-head to cushion the blow of the hammer, and as air in the second mentioned major channel was simultaneously expanded, pressure was reduced between the rear face of the chuck-head and the front face of the hammer thus permitting the pressure at the rear of the hammer to preponderate. It will be noted that these stated connections of chambers to the major channels 86 and 88 as shown, in Fig. 8, are the reverse in their connections with the same major channels to that shown in Fig. 7; and these connections thus alternate in regard to the successive transverse groups which are arranged vertically in the drill-block. Referring now to the passages shown in Fig. 7, 85 indicates the passage which extends from the back end of the outer chambers at the rear of the hammer, to the major channel 88, connecting with that channel through port 87, and 119 represents in dotted lines, the equivalent port which connects the middle chamber of this group to major channel 88. As before stated channel 88 is connected to channel 81 by channel 125; and passage 82 communicates with the outer chambers at their forward ends 139 in front of the chuck-head and connects with channel 81; the like portion of the middle chamber of this group being connected to channel 81 by passage 103, shown in dotted lines. The outer chambers of this figure connect at the rear end of portion 139, between the rear of the chuck-head and the front of the hammer, with channel 86, by means of a transverse passage 83, and a passage 135 extending from passage 83 to channel 86. The equivalent connection for the middle chamber is shown in dotted lines at 137.

Referring now to Fig. 8, which represents the next lower transverse group to that shown in Fig. 7, the passage 94, connecting with channel 86, through port 95, leads to the rear ends of the outer chambers; and a passage 141, shown in dotted lines, leads to a like part of the middle chamber. The front ends of the two outer of these three chambers are connected to the same channel 86, by means of a transverse passage 92 which connects with channel 79, a like portion of the middle chamber being connected to this channel 79 by a passage 138, shown in dotted lines, in this figure. Channel 79 is as before stated connected with channel 86, by the horizontal channel 145. The outer chambers intermediate the rear of their chuck-heads and the front of their hammers, are connected with the other channel 88, by passages 93 and 136, the former extending transversely between the outer chambers, and the latter passage connecting passage 93 to channel 88. A like portion of the middle chamber is connected to channel 88, by a passage 105 shown in dotted lines in Fig. 8, and in full lines in Fig. 6.

The operation of the drills and their actuating means are as follows: The pipe 76, which leads from any suitable compressed air supply, maintains a constant and practically uniform air pressure at for instance 100 pounds pressure in the chamber 133 of the air compressor, and, when the piston 132 is not in operation, this air, at a pressure of 100 pounds, enters, through the ports controlled by valves 74 and 75, and fills each end of the cylinder 77; from the opposite ends of which it flows through the pipes 60 and 58 to the major channels 86 and 88 respectively of the drill-block; and as all the chambers therein are connected, with the channels 86 and 88, at three points, in front of the chuck-head, between the chuck-head and hammer, and at the rear of hammer, it is evident that both faces of the chuck-heads and both faces of the hammers will be under pressure of 100 pounds, hence will be in a state of equilibrium; and at this point it may be well to say that to operate the drills, the compressed air is not exhausted to the atmosphere but the pressure of this compressed air, by means of the operation of the piston 132, as hereinafter explained is increased in one part of a chamber, and decreased in other parts thereof. With this explanation, it will be now assumed that the group of hammers shown in Fig. 7, have struck their chucks and are moving backward to their initial position, and the group of hammers, shown in Fig. 8, the group next below that shown in Fig. 7, are at the same time advancing forward to strike their chucks; the arrows on the hammers indicating their direction of movement; and the arrows in the chambers and passages representing the expansion and compression of the air therein, expanding air being represented as leaving a chamber, and air compressed being represented as entering a chamber. This movement of the hammers in Figs. 7 and 8, is accomplished in the following manner: The piston 132 of the air compressor moving upwardly in its cylinder, compresses the volume of air in the upper end of the cylinder, the valve 74 closing to prevent air being forced back to the point of supply of compressed air, hence compressing also the air in the hose 60 connected therewith and also in channel 86 connecting with hose 60 and in the passages connected with channel 86. Simultaneously the air in the lower end of the cylinder 57, in hose 58, in channel 88, and in the passages connected therewith expanded. This results in unequal air pressures in channels 86 and 88, and in the passages connected with each, the pressure in channel 86 and its connecting passages being greater than that in channel 88 and its connecting passages; and it is these unequal air pressures that cause the operation of drills. Referring again to Fig. 7, it will be seen that the volume of air in the chambers, now under greater pressure lies between the rear of the chuck-heads and the front of the hammers, this portion of the chambers being in communication with the channel 86, now under greater pressure, by passages 135 and 83 which lead to the two outer chambers, and by passage 137 which leads to the middle chamber. The volumes of air in the same chambers at the same time as the foregoing which are under lesser pressure, lie between the rear of their chambers and also between the front of the chuck-heads and the rear of the closing plugs 78, the first indicated portion of the chambers being in communication with the channel 88, now under lesser pressure, by passages 85 and 119 the former leading from the rear of the two outer chambers, and the latter from the rear of the middle chamber, and the second indicated portion of the chambers being in communication with channel 88, by means of passages 82 and 103 which lead from the front of the chuck-heads to minor channel 81, the passage 82, leading from the two outer chambers and the passage 103 from the middle chamber; and channel 81 is connected to channel 88 by channel 125.

Thus the hammers shown in Fig. 7, have a greater pressure on their front faces than on their rear faces, hence are driven backward by this inequality of pressure. At the same time that the foregoing movement of the transverse group of hammers and chucks shown in Fig. 7 was taking place, the transverse group next below, and shown in Fig. 8, were operating as follows: The air of greater pressure, in channel 86, and passage 94 and 144 (the latter leading to the middle chamber) connected therewith, and with the chambers at the rear of the hammers, exerted its force against the rear of the hammers; and this greater pressure of channel 86 was at the same time exerted against the front of the chuck-heads by means of passages 92 and 138 (the latter leading to the middle chamber) which lead therefrom to minor channel 79 the latter being connected to channel 86 by channel 145; and the lesser pressure of channel 88 was communicated to the front faces the hammers and the rear faces of the chuck-heads by means of passage 93 and its connection 136 and the passage 105 of the middle chamber. Thus the hammers shown in Fig. 8 having greater pressure at their rear faces than at their front faces are driven forward to strike their chucks; and as the air pressure on the front face of each chuck is greater than that on its rear face, the blow of the hammer against its chuck is cushioned to save the block parts from injury. If the movement of the air compressor piston be now considered as reversed, that is, that it is now moving downwardly in its cylinder, the pressure throughout the system will be reversed; air will be compressed in the lower end of the cylinder, in hose 58, in major channels 88, in horizontal channel 125, in minor channel 81, passages 85, 82 and 103 (Fig. 7) and in passages 105 and 93 and 136 (Fig. 8); and air will expand in the upper end of cylinder, in hose 60, in major channel 86, in horizontal channel 145, in minor channel 79, in passages 83, 135 and 137 (Fig. 7) and passages 94, 92 and 138 (Fig. 8). Under this condition of pressure the hammers of Fig. 7 will move forward against their chucks, which are simultaneously cushioned, and the hammers of Fig. 8, will move backward to their initial position. Thus it will be seen that one movement of the piston 132 causes one transverse group of hammers to strike a blow which is cushioned and at the same time causes the next vertical transverse group of hammers to return to their initial position, and a reversal of the movement of the piston 132 causes a reversal in the direction of operation of the hammers of the groups. The explanation of operation has so far been confined to two transverse groups of drills and their actuating parts and connecting passages and channels, but as the groups and their systems of passages, which connect with the continuous vertical minor channels 79 and 81 and major channels 86 and 88, are repeated vertically in the block, it will be understood that the successive transverse groups operate in the same manner as explained in detail in connection with these groups; thus for example, while the first, third, fifth, etc., transverse groups of drills are striking a thrusting blow under the impulse of the forward movement of their hammers, the second, fourth, sixth, etc., transverse groups of hammers are moving rearwardly to their initial position, and vice versa.

The air cushion formed in front of the chuck-head protect the block parts from injury should the drill not strike the wall. This air cushion does not reduce the desired force of the blow of its hammer as the area of the front face of the chuck, the face subjected to cushioning pressure, is less than the area of the face of the hammer subjected to the same air pressure, this difference of area being due to the fact that the transverse area of the shank of the chuck is not subjected to pressure; and the momentum which the hammer acquires aids in the force of its blow. The drill-block is formed in three sections in order that the channels, passages and ports, may be readily formed therein. In practice the volume of the compression cylinder is equal to the combined volumes of all the chambers in the drill-block. Thus it will be seen that the chambers of the drill-block, and the passages leading to the chambers, are constantly supplied through the pipe 76, with air under pressure; and it will also be seen that this supplied pressure maintains the hammers and drill-chucks in equilibrium, hence motionless except when the piston 132 of air compressor 59 is actuated. When piston 132 is actuated it increases the supplied pressure in one part of a chamber, reduces the supplied pressure in other parts of the same chamber hence destroys the equilibrium existing therein, and the hammers and drills are thus operated. It will also be seen that the air under pressure supplied through pipe 76 is never exhausted to the atmosphere but is acted upon by the piston 132 as hereinbefore explained.

The drill-block on its side faces near the bottom thereof, are formed with brackets 32 each of which adjustably carries and retains a slide-plate 31, which carries a wheel 29 disposed to travel in areas of which the pivotal point of the drill-block is the center and adapted also to contact with the ground and to thus sustain the drill-block and support the greater part of its weight as it oscillates upon its pivotal support. These wheels relieve the brackets 28 and 50 of the greater part of the weight of the drill-block, hence reducing to a minimum the friction on the bearings due to the oscillation of the drill-block. The plates 31 are adjusted by means of screws 52 which are swiveled to the slide-plates and engage threads in the brackets 32.

Secured to the front of the drill-block by brackets 37, is a combined guide and shield composed of a back-plate 36 and forwardly projecting side-plates 34 which protect the machine from the cuttings. The plate 36 is provided with openings having their centers in alinement with the chambers of the drill-block, and at each opening the plate has a drill-guide 121 which is provided with intersecting rectangular openings which are adapted to receive the ribs of drills 35 to guide and support the drills and keep them in alinement with the axis of their chambers during their reciprocation.

Each drill is secured to its chuck 38, (see Fig. 5) by means of the ribs of the former entering corresponding slots 101 in the shank of the latter and being retained therein by a heavy spring ring 100, provided with an inwardly projecting rib 99 which enters a slot 98 in the chuck, and enters also a registering slot in the rib of the drill intersecting the slot 98. This occurs when the ring 100 is in place embracing the shank of the chuck. As the resiliency of the spring-ring 100 is sufficient to hold it in position around the shank of the chuck, the rib of the spring will firmly hold the drill in engagement with the chuck.

Figure 15:
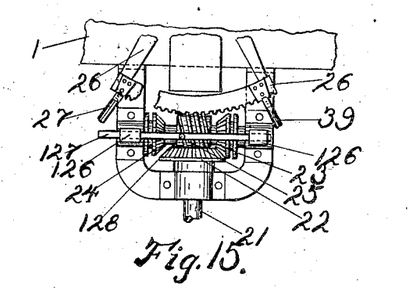
Fig. 15 is an enlarged top view in detail of that part of the gear mechanism whereby the swing drill-block is caused to be turned to the right or to the left in working against the breast of the tunnel.
Figure 16:
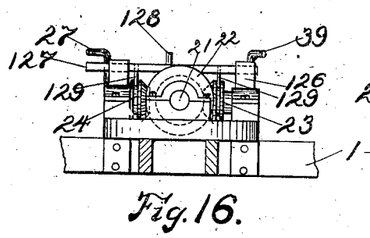
Fig. 16 is an enlarged rear view of the parts shown in Fig. 15, for reversing the movement of the drill swing block.
Figure 17:
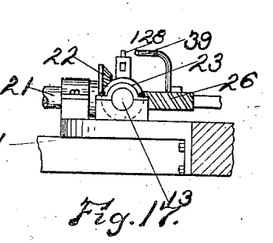
Fig. 17 is an enlarged side view of the detail parts shown in Fig. 16.
Figure 18:
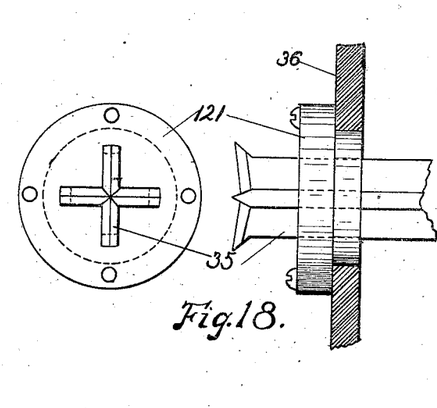
Fig. 18 shows enlarged front and side views of the drill-bit and its guide bearing collar in the face-plate fixed to the front of the swing drill-block.

The drill-block is provided at its center and below the line of drill-chambers with a circular, horizontally disposed chamber 142, (Fig. 6) the front end of which communicates by a passage 143 with one of the major channels, the rear end communicating by a passage 112 with the other major channel. The chamber 142 receives a piston 117 whose rod 115 passes through an opening in the plug which closes the front end of the chamber 142. It will be seen therefore that the piston 117 is actuated by the air pressure in the same manner as the hammers. The piston-rod 115 is provided with a vertical hole through which loosely passes a stud 116 projecting from the front end of a reciprocating muck-pan 54. This stud is free to slide vertically in the hole in the piston-rod thus letting the front end of the pan rest on the ground, while at about the middle of its length the pan is pivotally hung to the drill-block by arms 53, one arm at each side of the block so that the weight of the front end will preponderate. The bottom of the muck-pan is also provided with upwardly and rearwardly inclining ribs 144, the purpose of which is to hold and prevent the return of the muck by the movement of the pan. The piston-rod has fastened to it, a collar 113, and a bumper-spring 114, on said rod. The rear end of the muck-pan enters the front end of an apron 56 which houses a slot conveyer 71 actuated by sprocket-gears 70, the shaft of one gear 70 carrying a spur gear 70' which meshes with a gear 5, the shaft of which carries the lower roll of a vertically disposed conveyer 67 having buckets 6, the upper end of said bucket-conveyer being supported and actuated from a shaft 66, mounted in brackets 65 carried at the rear end of the car. The lower shaft of this bucket conveyer is supported by brackets 4 and 7 which also support the rear end of the apron 56, which at this end terminates in the boot 68, of the bucket-conveyer. The shaft 66, is driven from the shaft 62, by the belt 61, and shaft 66, in turn drives shaft 141 which carries the lower roller 140 of conveyer 67, and also carries the spur-gear 5, which meshes with gear 70' and drives it. Shaft 62 is connected to a motor element 19 by a belt 63, and motor 19 is connected to, and actuates the belt-pulley 57 of the air compressor. Counter-shaft 62 is also connected by belt 144 to a pulley 18, the inner end of the shaft of which has rigidly secured thereto a bevel gear 124, which is in constant engagement with a bevel-gear 17 carried by a shaft 21 journaled upon the car and extending longitudinally thereof. The shaft 21 has a bevel-gear 14 fixed thereto at its rear end, and a bevel-gear 22, fixed to its front end. The bevel gear 22 is adapted to mesh with either one of two bevel-gears 23 and 24 both carried by a shaft 13 journaled as shown, and upon which they are free to slide, but with which they are caused to rotate by the medium of the ordinary feather and groove arrangement. The shaft 13 has rigidly secured thereto, intermediate the gears 23 and 24, a worm 25, which is in mesh with the segmental worm-wheel 26 fixed to the drill-block 33. Each of the bevel-gears 23 and 24 is formed with an annular groove, into which project pins 129, fixed to a rod 127, slidably supported by brackets 126 upon the bearings of the shaft 13. The slide rod 127 carries an upwardly projecting pin 128 which is adapted to be struck by either of two arms 27 or 39 carried by the segmental worm-wheel 26 which, in Fig. 15 for the purpose of illustrating the arms 27 and 39 in this view, is shown broken.

Figures 11, 12, 13, 14:
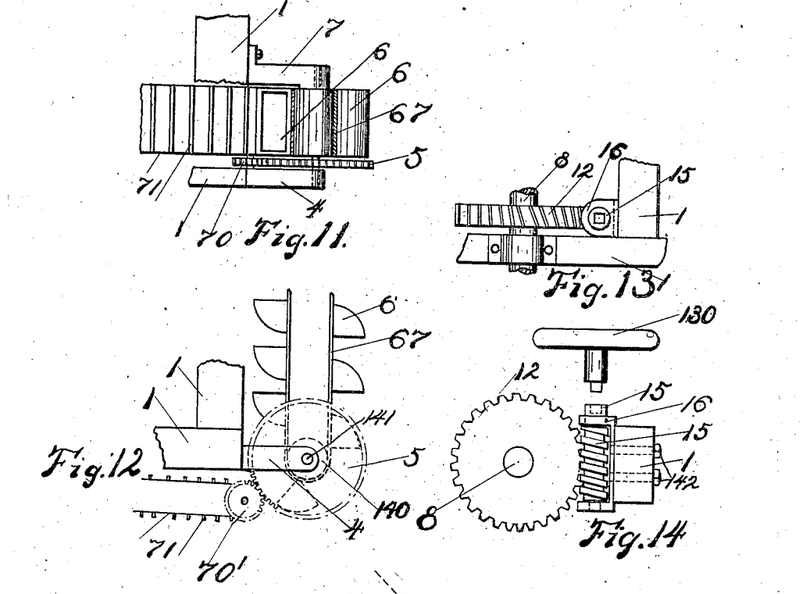
Fig. 11 is an enlarged detail top view of the bucket elevator that receives the muck from the conveyer and its operating gear.
Fig. 12 is an enlarged detail showing in side view the relation of the elevator to the conveyer and the gear by which they are operated.
Fig. 13 shows an enlarged detail top view of the gear connection with the shaft of the rear supporting wheels for the purpose of manually feeding the machine up to the breast of the tunnel and to lock it in such position when at work.
Fig. 14 is an enlarged side view of the parts shown in Fig. 13.

The bevel-gear 14 carried by the shaft 21 at its rear end, is adapted to mesh with either of two bevel-gears 10 or 11 rigidly secured to a sleeve 9 carried by the shaft 8, which forms the rear axle of the car, and upon which it is free to slide but is compelled to rotate therewith by the usual clutch feather and groove arrangement. The sleeve groove is adapted to be engaged and operated by the usual clutch lever (not shown) and by means of which either of gears 10 or 11 can be shifted into engagement with bevel-gear 14 in the manner of a clutch. The rear axle 8, has also secured thereto a worm-wheel 12 which is engaged by a worm 15 mounted in a bracket 16 which is adapted to be secured to the frame of car by bolts 142 (see Fig. 14).

The worm is provided at its upper end with a removable socket adapted to receive the square end of a key provided at its upper end with a hand wheel 130, to be used for a purpose hereinafter stated.

Carried at each side of the car, are means for guiding the car straight in its movements in the tunnel and for holding the car in any position therein, and it consists of a pair of arms 41—41 at each side of the car, arranged with their abutting ends pivoted thereto by means of a bracket about mediately of the length of the car and extending from their pivotal connection 44, obliquely outward toward the front and toward the rear and terminating in a roller 42, adapted to roll upon the vertical wall as the car advances and being braced to the car their relative positions causes them to have the function of a straight edge in keeping the car in a straight line. For this purpose means are provided for maintaining these arms in rigid relation and allow of their adjustment to hold the rolls nearer to or further from the car and the means shown for this purpose consists of a screw-rod 48, pivoted to each arm near its roller end and is connected to the car frame by a swivel joint formed by a bracket 45, secured to the car and a screw-sleeve 72, mounted by a bearing 46, secured in the bracket as in Fig. 3. An adjusting-nut 47 on the rod abuts against the end of the screw-sleeve and the adjustment of the pivoted arms is made by setting the rods further into or out of the screw-sleeve by means of the nut and when so set the nut serves to lock the screw-rod. Each of the pivoted arms is provided near its outer end with a plurality of holes into any one of which a pin 43 serves to connect the screw-rod to the arm, the end of which for that purpose being forked to embrace the arm. It will be understood that the swivel-screw-sleeve joint while allowing the adjustment of the screw-rod, the adjustable connection of the rod with the arm is provided to suit the adjustment in or out of the arm.

The operation of my invention, in tunneling not now including a detailed statement of the operation of the drills and their actuating means as these have been heretofore explained, is as follows: The worm 15, having been removed after loosening its bolts 142, to unlock the traction shaft, the machine is brought into position in a tunnel with its drills in operative relation to a breast-wall. This can be accomplished by power transmitted from the motor 19, to the counter shaft 62, which in turn actuates the pulley 18 and its gear 124, the latter through the medium of bevel-gear 17, actuating the bevel-gear 14, and the sleeve 9 having been shifted to bring bevel-gear 11 into contact with gear 14. When this is done the shaft 8 or the rear axle of the machine is revolved with its traction wheels 2 and the car advanced to its operative position, to which it is guided by the arms 41 their rollers 42 engaging the sides of the tunnel. If now desired, the machine can be held in this position by first shifting the sleeve 9 so that neither of its gears 10 or 11 engage the bevel gear 14, then screwing the arm 41 outward into forcible contact with the sides of the tunnel, this being accomplished by means of the nuts 47. If it is desired to advance the machine to this position, by the application of manual power, the worm 15 is left in place on the car, and the sleeve 9 shifted to keep its bevel gears 10 and 11 out of engagement with the bevel-gear 14. By then turning the hand-wheel 130 the worm-wheel will be rotated, turning the rear axle and the wheels thereon and the car is thereby advanced to the desired position, and the worm by locking the worm-wheel will prevent the rear axle from turning and thus keep the car from moving by the thrusting action of the drills, out of the desired position. Generally, the gear-wheels 10 and 11 and their co-operating means are used when it is desired to move the machine a considerable distance, the worm-gearing 12 and 15 being used at other times.

Figures 2, 3:
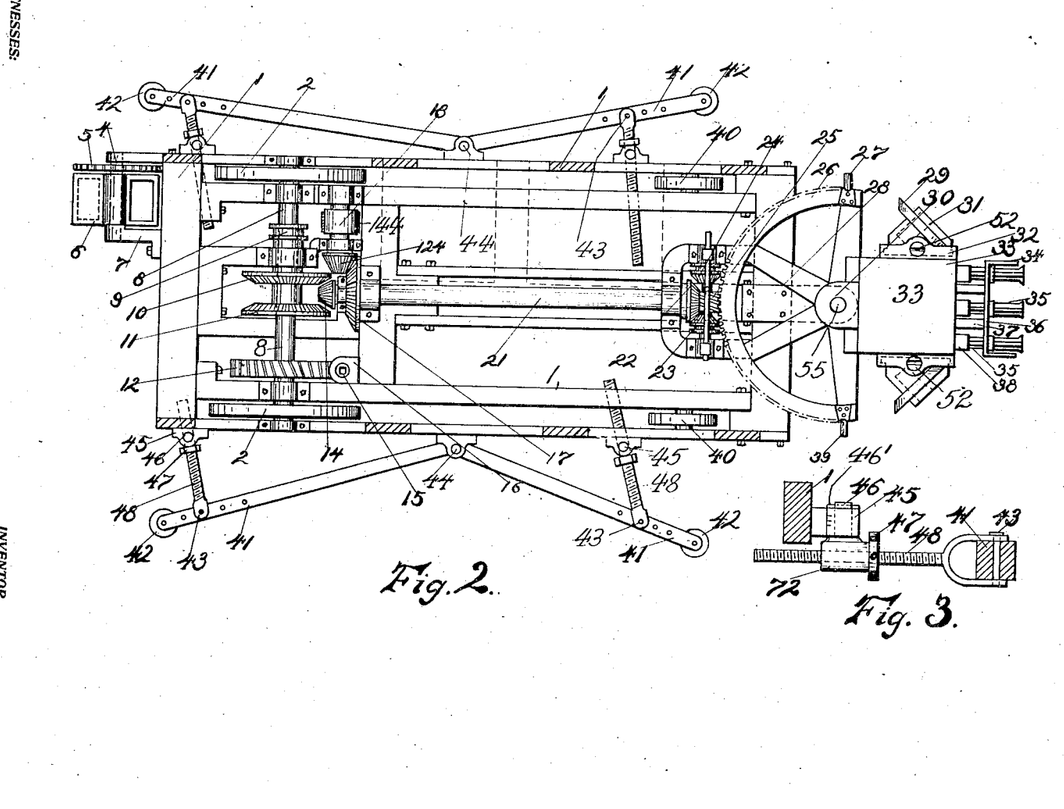
Fig. 2 is a top view of so much of the machine as shows the mechanism by which the swing drill-block is automatically turned to the right or to the left in its relation to the breast being tunneled.
Fig. 3 is an enlarged detail view of the adjustable connection of the guide-arms by which the machine is held and guided against the side walls of the tunnel.
Figure 4:
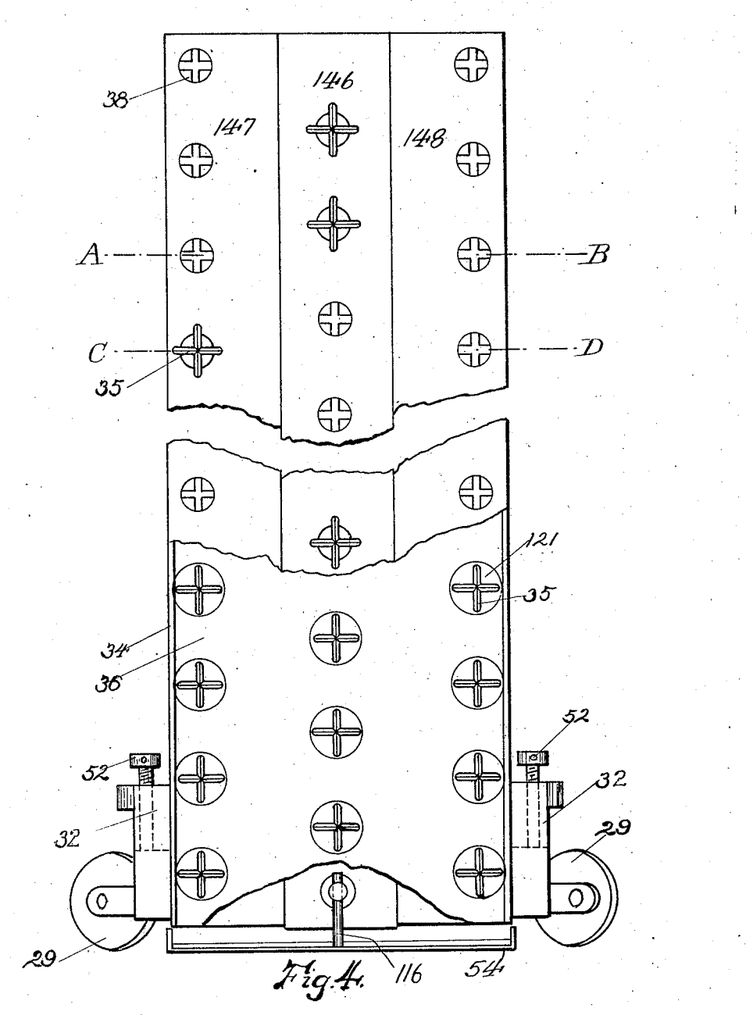
Fig. 4 shows enlarged a front elevation partly broken of the swing-drill-block, its supporting wheels and the arrangement of the drills in vertical and horizontal groups.

With the drills in operative relation to the breast-wall, the air compressor is actuated and, as before explained the drills 35 are reciprocated into and out of contact with the breast wall. As the drills are reciprocating, the shaft 21 is also being turned by its rear end bevel-gear 17 which is in mesh with bevel-pinion 124, and the gear 22 carried by shaft 21 engages with which either one of the gears 23 or 24 that is shifted into mesh with it, the gear 23, for instance, as shown in Fig. 2. The consequent actuation of the gear 23, causes the rotation of the worm 25 which in turn moves the segmental worm-wheel 26, this resulting in turning the drill-block about its pivotal axis and cutting the breast in the arc of a circle. As the drill-block continues to turn, its arm 27, comes in contact with the pin 128 of slide-bar 127, pushing the slide-bar towards the gear 23, and by means of the pin engagement 129 of the slide-bar with these gears, the gear 23 is pushed out of engagement with the gear 22 and the bevel-gear 24 is forced into engagement therewith. The rotation of the gear 24 now changes the direction of rotation of the worm 25 hence of the segmental worm 26 and the drill-block is now turned in a direction opposite to that of its former movement. As movement under the impulse of gear 24 continues, the pin 39 comes in contact with the pin 128 and the gears 23 and 24 are again shifted. This reversal of direction of movement of the drill-block by these means, is thereafter repeated.

Figures 9, 10:
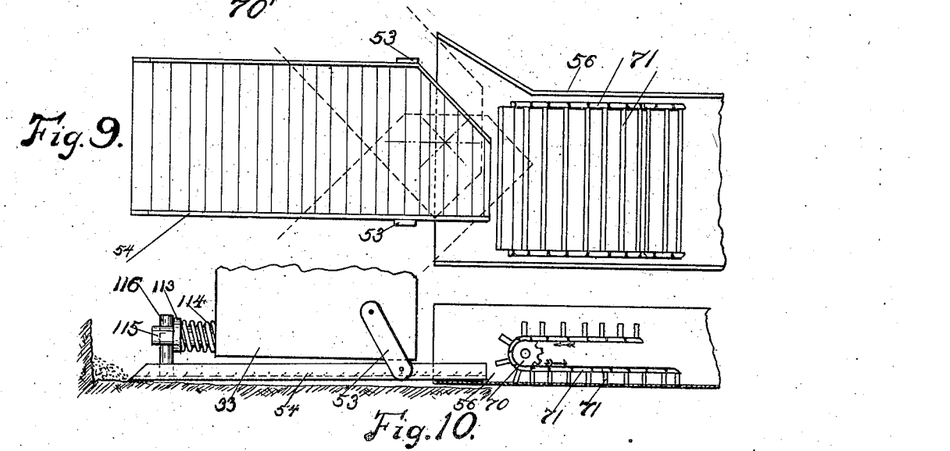
Fig. 9 is a top view on smaller scale of the muck-pan for the cuttings or chippings and its relation to the conveyer for conveying the chippings away.
Fig. 10 shows in side elevation on smaller scale the muck-pan as it is suspended from the swing drill-block and a portion of the conveyer in vertical section.

The cuttings from the drills, the water used against the breast-wall and the material loosened thereby, fall to the ground and are scooped up by the front end of the muck-pan 54, this end, by reason of the loose engagement of its stud 116 by the piston-rod 115, lying on the ground and the rear end being held slightly thereabove by the suspending arms 53. As the piston-rod carried the muck-pan rearward, the collar 113 strikes the bumper-spring 114 slightly in advance of the end of the stroke of the piston 117 thereby causing a jar and sudden stoppage of the pan which throws the material it carries rearward upon the corrugated bottom of the muck-pan, and, finally, by reason of the continued reciprocations and jars of the muck-pan the material thereon is thrown from its rear end upon the bottom of apron 56, where it is caught by the slot conveyer 71 and carried farther to the rear and delivered into the boot of the bucket conveyer 67 which in turn elevates and dumps it into a car or tank, not shown, for removal from the tunnel. As the drill-block swings from one side to the other, the muck-pan, being carried by it, consequently swings with it; but the rear end of the pan always maintains a proper working relation to the slot conveyer 21 and its apron 56 as is illustrated in Fig. 9.

If it is desired to move the car backward by mechanical power, the opposite gear 10 for illustration, from that used to move the car forward, is thrown into engagement with the bevel-gear 14 and the arms 41 having been withdrawn from binding contact with the sides of the tunnel the car will then move rearward, it being assumed that the worm 15 has been removed from the car; or this worm, if it be desired to move the car by the application of manual power can be used for this purpose as will be readily understood.

An advantageous feature of my machine is its ability to cut a clearance for itself as it advances in a tunnel, this it accomplishes laterally through the oscillation of the drill-block; and its vertical clearance, the excess of the vertical height of the cut over that of the machine, is secured by the upper and lower transverse rows of drills splaying or inclining outwardly as stated. Thus the cutting ends of the top row of drills project above the top of the drill-block, and the cutting ends of the bottom row of drills, in a like manner, project below the lower edge of the drill-block.

It is important to note that the pivotal mounting of the block is at its rear side, mediately of its width and mediately of the width of the car and in alinement with the shaft from which power for the oscillation of the block is delivered; and that the extent of its oscillation enables the drills to cut a sufficiently wide area to give room for the car and its connections to advance.

So far as I know and can find I am the first to produce in an organized tunneling machine drills pneumatically operated in groups that alternate in striking a thrusting blow by a process which consists in first subjecting the opposite faces of the drill actuators to equal pressures of compressed air, then simultaneously increasing the supplied pressure at one face of the actuators and decreasing the supplied pressure at the other face of the actuators and then reversing the unequal pressures on the faces of the drill actuators, the pressures on the corresponding faces of the drill actuators for one group being the opposite of that for the other group.

I wish it to be understood that I do not desire to be limited to the exact details of construction shown and described, for obvious modifications will occur to a person skilled in the art.

I claim:

1. In a tunnel driving machine, a car, a block pivotally mounted upon the car so as to swing horizontally in front thereof, thrusting drills carried by the block, and means mounted on the car and on the block for automatically oscillating the drill-block, the said means adapted for alternate contact—the means on the block with the means on the car at each oscillation of the block, means for operating the drills, and means for causing the car to advance in the cutting operation.

2. In a tunnel driving machine, a car, a block pivotally mounted on the car, thrusting drills carried by the block, and co-acting means carried by the car and by the block and adapted for continuous alternate contact—the means on the block alternating with the means on the car for automatically oscillating the drill-block in both directions, means for operating the drills, and means for causing the car to advance in the cutting operation.

3. In a tunnel driving machine, a car, a block pivotally mounted thereon, thrusting drills carried by said block, means for automatically oscillating the drill-block consisting of a slidable gear reversing device on the car, a segmental gear on the block, an arm projecting diametrically from each side of the segmental gear, the arm on one side adapted to engage and shift the reversing gear device in one direction, the other of said arms adapted to engage and shift the reversing gear device in the opposite direction the engagements being in continuous or alternate succession, means for continuously operating the segmental gear, means for operating the drills, and means for causing the car to advance in the cutting operation.

4. In a tunnel driving machine, the combination with a car, of a drill-block pivotally mounted thereon, a worm segment fixed to the drill-block, a worm journaled upon the car and in mesh with the worm segment, a bevel-gear mounted upon each end of the worm-shaft free to slide thereon but keyed to rotate therewith, a horizontal slidable bar continuously engaging both bevel-gears, a longitudinal shaft journaled on the car, means for actuating this shaft, a bevel-gear fixed to this shaft and adapted to actuate either of the bevel gears on the worm-shaft, and arms extending from opposite sides of the segmental worm wheel and adapted to automatically engage and alternately contact with and move the slidable bar to throw the gears on the worm-shaft into and out of engagement with the gear on the longitudinal shaft.

5. In a tunnel driving machine, the combination with a car, of a drill-block pivotally mounted thereon, a segmental worm wheel fixed to the rear of the drill-block, a worm journaled on the car and in mesh with the segmental worm-wheel, bevel-gears on the shaft of said worm wheel and at opposite sides thereof, the bevel-gears being free to slide on the worm-shaft but connected to rotate therewith, a longitudinal shaft journaled on the car, means for actuating this shaft, a bevel-gear rigidly secured to each end of the longitudinal shaft, the front gear being adapted to mesh with either one of the bevel-gears carried by the worm-shaft, a slidable bar engaging the bevel-gears 23 and 24 means carried by the segmental worm and adapted to automatically engage said slidable bar to alternately throw the bevel-gears on the worm shaft into engagement with the front gear on the longitudinal shaft, and means for continuously operating it, whereby to effect the continuous oscillation of the drill-block.

6. In a tunnel driving machine, the combination with a car, of a drill-block pivotally supported by the car at its front, a segmental worm fixed to the drill-block, a worm 25 journaled on the car, bevel gears carried by the shaft of the worm one being at each side thereof the bevel gears keyed to slide on the shaft, a longitudinal shaft journaled on the car, a bevel gear fixed to its front end and adapted to engage either of the bevel-gears on the worm-shaft, a bevel-gear fixed to the rear of the longitudinal shaft, means carried by the drill-block and adapted to alternately force the bevel-gears on the worm-shaft into and out of engagement with the bevel-gear on the front of the longitudinal shaft, a traction axle journaled on the car, and means on the car for causing the longitudinal shaft to be rotated to the right or to the left, whereby to effect the continuous oscillation of the drill-block and the forward and backward movement of the machine.

7. In a tunnel driving machine, a car, a block pivotally mounted thereon, thrusting drills carried by the block, a pair of supporting wheels one mounted at each end of the block in advance of its pivotal mounting, a muck-pan suspended from and beneath the block, and means carried by the block for connecting it to the pan for causing it to have a reciprocating movement.

8. In a tunnel driving machine, a car, a block pivotally mounted thereon, thrusting drills carried by the block, a muck-pan suspended from and beneath the block, a pair of supporting wheels one mounted at each end of the block in advance of its pivotal mounting, power driven gear mounted on the car, a gear fixed on the block both gears in constant engagement for causing the block to be continuously oscillated horizontally, and a compressed air actuated piston carried by the block and connected with the pan for causing it to have a reciprocating movement.

9. In a tunnel driving machine, a car, a block pivotally mounted upon the car and projecting in front of it, supporting wheels carried by the block, and adapted to travel in the arc of a circle described by said block in front of the mounting pivots, drills carried by the block, a segmental worm fixed to the block, a worm mounted upon the car and engaging the segmental worm, and means for actuating said worm to actuate the segmental worm and to cause the oscillation of the drill-block.

10. In a tunnel driving machine, a car, a block pivotally mounted upon the car and projecting in front of it, wheels adjustably supporting the block, thrusting drills carried by the block, a segmental worm fixed to the drill-block, a worm mounted upon the car and engaging the segmental worm, means carried by the car for actuating the worm, means for reversing the direction of rotation of the worm, a pan pivotally hung from the drill-block and adapted to take the material loosened by drilling, and means carried by said block for reciprocating the pan.

11. In a tunnel driving machine and in combination, a car, a block pivotally mounted thereon, a pair of supporting wheels one at each end of the block in advance of its pivotal mounting, thrusting drills carried by the block, power-driven mechanism mounted on the car, a segmental gear fixed on the block in constant engagement with the car-gear whereby the block is caused to be continuously oscillated, a muck-pan suspended from and beneath the block, means carried by the block for reciprocating the pan, an endless conveyer mounted beneath the car, and an endless conveyer mounted at the rear of the car both conveyers having geared connection, and means mounted on the car for actuating the conveyers.

12. In a tunnel driving machine, the combination with a car, of a block mounted thereon and projecting in front thereof the block being provided with a plurality of drill chambers, a drill-carrying chuck and its actuating hammer in each chamber, a pan pivotally hung from and beneath the drill-block, a piston mounted to reciprocate in a chamber in the lower portion of the drill-block, a connection extending from the rod of the piston to the pan and adapted to move the pan in with the piston, an air compressor carried by the car and fluid connections extending from the air compressor to the drill-chambers and the piston-chamber and adapted to convey the variations of air pressure in the chambers for the purpose stated.

13. In a tunnel driving machine, the combination with a car, of a block pivotally mounted thereon and projecting in front thereof, the block being provided with a plurality of chambers and communicating passages, a thrusting drill in each chamber, a pan pivotally suspended from and beneath the drill-block, a piston in a chamber at the power portion of the drill-block, said block having openings 58'—60' leading to its exterior and having also passages connecting the chambers in the block with said exterior openings, an air compressor carried by the car, and a hose extending from each end of the air compressor cylinder to one of the exterior openings of the drill-block and a stud fixed to the forward portion of the pan and slidably connecting the piston-rod.

14. In a tunnel driving machine, the combination with a car, of a drill-block pivotally mounted thereon in front thereof, coacting means carried by the car and by the drill-block for oscillating it about its pivotal axis, said block having a chamber formed in its lower portion, and having also a passage 143—112 extending from each end of the chamber to the exterior of the block, a piston and its rod mounted to reciprocate in said chamber, a pan pivotally hung near its rear end to and beneath the drill-block, the pan having near its front end a stud projecting through a hole in the piston-rod, an air compressor carried by the car, a flexible conduit connecting each end of the air compressor cylinder with one of the passages in the block, a horizontal conveyer carried by the car and adapted to receive material from the reciprocatory pan, a vertical conveyer adapted to receive material from the horizontal conveyer, and means for actuating the conveyers, the relation of the reciprocatory pan and the horizontal conveyer being such that they are at all times during the oscillation of the drill-block in proper position to transfer material from the pan to the conveyer.

15. In a tunnel driving machine, the combination with a drill-block having at its lower portion a chamber and also a passage extending from each end thereof to the exterior of the block, a rolling support for the block, a piston and its rod in said chamber, a pan having a bottom formed with upwardly and rearwardly extending ribs, a pair of arms each pivotally connected to a side of the drill-block and to a longitudinal side of the pan near its rear end, a stud fixed to the front end of the pan and slidably engaging the piston-rod to permit the front end of the pan during its reciprocation to rest on the ground, a bumper spring on the piston-rod adapted to stop with a jar the rearward motion of the pan, and means connected to said passages for supplying air under pressure to the piston chamber and adapted to alternately establish unequal air pressures therein for reciprocating the piston.

16. A car, a drill-block mounted upon the car, a pan having transverse ribs and a stud fixed to its front end, arms pivotally suspending the pan from the block, a piston operative within a chamber near its bottom and having the piston-rod connected to the stud of the pan, an air compressor and connections thereof with said chamber for operating both the piston and the pan, a buffer interposed between the stud and the block.

17. A drill block having a plurality of compressed air actuated reciprocatory drills, and having also a chamber in the lower portion of the block, a piston and its rod arranged to reciprocate in the chamber under the pressure of the compressed air, a pan pivotally suspended from the block and below the drills and formed with transverse ridges, a stud projecting from the pan and slidably engaging the piston-rod, a buffer adapted to effect the sudden stoppage of the rearward movement of the pan, and means for controlling the compressed air to actuate the drills, piston and pan.

18. In a tunnel driving machine, a block having a plurality of chambers, a thrusting drill in each chamber, the said block having passages leading from each chamber to external openings in said block, an air compressor, a power actuated piston therein, a tube extending from one end of the cylinder of the air compressor to one of the block external openings, and a tube extending from the other end of the cylinder of the air compressor to the other block external opening—the reciprocation of the piston of the compressor causing thereby the reciprocation of the drills, substantially as described.

19. A drill block, having a plurality of chambers therein, a drill holding chuck, and a reciprocatory hammer in each chamber, said block having exterior openings and having also two passages leading from each chamber one of the passages communicating with the chamber at the rear of its hammer and the other passage communicating with the chamber between the chuck-head and hammer and each passage connecting with one of the opposite exterior openings, and means connected with the exterior openings and adapted to simultaneously produce unequal air pressures therein and adapted also to alternate these pressures in the openings.

20. A drill-block, having a plurality of chambers, therein, a drill holding chuck and a reciprocatory hammer in each chamber, said block having inclosed major channels 86 88 formed in the block, and having also an opening connecting each channel with the exterior of the block, said block having a passage extending from the rear of each chamber to a channel, and having also a second passage extending from each chamber, between the chuck-head and hammer to the other channel the connection of the chambers to the channels alternating in the successive transverse groups of chambers, and means connected to the exterior openings of the drill-block for supplying air pressure thereto, the pressures supplied simultaneously to each opening being equal, this means being also for the purpose of alternating in the openings and their connected spaces the unequal air pressures therein.

21. A drill-block, having a plurality of horizontal chambers therein and arranged in vertical series, a drill holding chuck and a reciprocatory hammer in each chamber, said block having inclosed major channels 86 and 88, vertically disposed in the block near its rear face, and having also an opening connecting each major channel with the exterior of the block, said block having inclosed minor vertical channels 79 and 81 in the block near its front face, and having also a cross channel 125—145 connecting each minor channel with the oppositely disposed major channel, said block having a passage connecting the rear ends of the chambers of a transverse group with one of the major channels, and having also a passage connecting the front ends of the same chambers in front of the chuck-heads with the minor channel connected to the last indicated major channel, said block having a passage connecting the same chambers at a point between the chuck-heads and hammers therein with the other major channel, and means connected to the exterior openings of the drill-block for supplying air under pressure—the working pressure supplied to one exterior opening being greater than that supplied to the other exterior opening—this means being also for the purpose of alternating the unequal pressures of the openings and their connected spaces for the purpose of actuating the hammers in transverse groups which alternate in striking their chuck a blow.

22. A drill-block, having a plurality of chambers therein, a drill holding chuck and a reciprocatory hammer in each chamber, said block having inclosed channels 86 and 88 in the block, and having also an opening connecting each channel with the exterior of the block, said block having a passage extending from each chamber between the chuck-head and hammer therein to one of the channels, and having also a second passage extending from each chamber at its rear end to the other channel the connection of the chambers to the channels alternating in the successive transverse groups of chambers an air compressor, a tube extending from each end of the air compressor cylinder to one of the exterior openings of the block, and means for supplying the air compressor, at each end of its cylinder with air under pressure the reciprocation of the piston of the air compressor causing the drills to operate in groups which alternate in striking a thrusting blow.

23. A drill-block composed of a plurality of longitudinal sections, each section having a series of chambers therein, a drill holding chuck in each chamber, a reciprocatory hammer in each chamber, said section having inclosed major vertical channels 86 and 88 in the contiguous faces of the sections near one end thereof, said sections having also inclosed minor vertical channels 79 and 81 in the contiguous faces of the sections near the opposite end thereof, said sections having passages 145—125 connecting the minor vertical channels with the oppositely disposed major vertical channels, said sections having passages leading from the chambers at the rear of the hammer and connecting with one of the major channels, and having also passages leading from the chambers in front of the chuck-head and connecting with the minor channel oppositely disposed to the last indicated major channel, said sections having passages leading from the chambers between the chuck-head and hammer and connecting with the second major channel, said sections having an opening 60'—58' leading from each major channel to the exterior of the block, pipes one leading from each exterior opening to the cylinder of an air compressor the pipes being connected to opposite ends of the compressor cylinder which is thereby adapted to alternately establish unequal air pressures in the major channels and their connecting passages for the purpose stated.

24. A drill block having a plurality of chambers formed therein, a reciprocatory drill holding chuck and a reciprocatory hammer in each chamber, said block having major channels 86 and 88 in the block near its rear face, and having also minor channels 79 and 81 in the block near its front end, said block having connecting passages 145—125 between each minor channel and the oppositely disposed major channel, said block having a passage extending from each chamber between the chuck and hammer therein to one of the major channels, said block having a second passage leading from the chambers at their rear ends to the other major channel, said block having also a third passage leading from the chambers at the front ends in front of the chuck-head and connecting with the minor channel that is connected to the last indicated major channel said block having an opening 60'—58' connecting each major channel with the exterior of the block, an air compressor a tube extending from each end of the cylinder of the air compressor to an exterior opening 60'—58' in the block, and a flexible connection for a compressed air supply with the cylinder of the air compressor and adapted to maintain in the latter when it is not in operation equal air pressures in the opposite ends of its cylinders and in the spaces in connection therewith for the purpose stated.

25. A drill-block formed of a plurality of rigidly connected longitudinal sections each section having a series of horizontal chambers, a drill holding chuck having a head in each chamber, a hammer in each chamber, said block having inclosed major vertical channels 86 and 88 in the contiguous faces of the sections near the rear thereof, said block having also inclosed minor vertical channels 79 and 81 at the contiguous faces of the sections near the front thereof, said block having a horizontal passage 145—125 connecting each minor vertical channel with the oppositely disposed major vertical channel, said block having passages leading from the chambers at the rear of the hammers to the major vertical channels the block having passages leading from the chambers in front of the chuck-head to the minor vertical channels, said block having also passages leading from the chambers between the chuck-heads and hammers, and connecting with the major vertical channels, the passages being so disposed that the transverse groups of chambers alternate in their connection with the major vertical channels and with the minor vertical channels, said block having an opening connecting each major vertical channel with the exterior of the block, an air compressor, a tube connecting each end of the cylinder of the air compressor with an exterior opening of the drill-block, said air compressor having a chamber 133 formed on the exterior of the air compressor cylinder, inwardly opening valves connecting this chamber with the opposite ends of the cylinder of the air compressor and a compressed air supply connected with the chamber the reciprocation of the piston of the air compressor resulting in the operation of the drills in transverse groups which alternate in striking a thrusting blow.

26. A drill-block, having a plurality of chambers therein, reciprocatory drills in the chambers, said block having exterior openings formed in the drill-block, said block having also passages connecting the chambers with the exterior openings, an air compressor a pipe leading from each end of the cylinder thereof to one of the exterior openings, a tube leading from the compressed air supply to both ends of the cylinder of the air compressor, valves adapted to cut off either end of the air compressor cylinder from the compressed air supply during a stroke of the air compressor piston which alternately compresses and expands the air under pressure in the pipes leading from the ends of its cylinder this resulting in unequal pressures in the opposite ends of the drill chambers which causes the reciprocation of the drills.

27. A drill block, having a horizontally disposed chamber therein, a drill-carrying chuck and a reciprocatory hammer mounted in the chamber, said block having a passage leading from the rear of the chamber at the rear of the hammer to an exterior opening of the block, said block having also a passage leading from the chamber between the chuck-head and hammer to the exterior opening of the block, an air compressor, means for supplying compressed air to the cylinder of the air compressor at each side of its piston, and tubes one leading from each end of the cylinder of the air compressor to one of the exterior openings of the block.

28. A drill-block having a horizontal chamber the front portion of which is of greater diameter than the rear portion thereof, a drill-holding chuck having an enlarged head adapted to be reciprocated in the front portion of the chamber, a hammer seated in the rear portion of the chamber and adapted to be reciprocated to strike the drill-carrying chuck, the said chamber having the following connecting passages—one leading from its rear end and terminating at the exterior of the block, a second connecting the first passage with the front portion of the chamber in front of the chuck-head, and a third passage connecting said chamber between the rear of the chuck-head and the front end of the hammer and communicating with the exterior of the block independently of the exterior opening of the first passage, an air compressor, a tube leading from each end thereof to the end of each passage opening at the exterior of the block, the said air compressor having an exterior air chamber, inwardly opening valves connecting this air chamber with each end of the air compressor, and a tube connecting a compressed air supply in communication with the air chamber, the valves being adapted to close when the air compressor piston approaches them.

29. The combination with a block and reciprocatory drills carried thereby, of a guide and guard fixed to the block in front thereof and consisting of a face-plate having openings in alinement with the drills, a drill supporting disk in each opening the disk having an opening adapted to receive and support a drill the center of the opening in the disk being in alinement with the longitudinal axis of the drill, and side plates projecting forwardly from the face-plate.

30. In a tunnel driving machine and in combination, a car, a pivotally mounted block at the front thereof, drills carried by said block, means for operating the drills, and means whereby the car is caused to advance in the cutting operation, and means for guiding the car in its advance consisting of a pair of arms pivoted to each side thereof, the other end of each arm terminating in a roller, a screw-rod pivoted to each arm, a sleeve for each screw-rod pivotally mounted on the car and adapted to slidingly support said screw-rod, and a nut engaging the screw-rod, swiveled to the sleeve and adapted to adjust the screw-rod toward or from the car.

31. In a tunnel driving machine and in combination, a car, a pivotally mounted block at the front thereof, drills carried by said block, means for reciprocating the drills, a plate mounted on the block and having openings, and a collar for each drill fixed in each opening and forming a support and guide for the reciprocating movements of the drill.

32. In a tunnel driving machine and in combination, a car, a pivotally mounted block at the front thereof, drills carried by and projecting from the front of said block, means for reciprocating the drills, and means secured to said block for supporting and guiding the projecting ends of the drills in their movements.

33. In a tunnel driving machine, a car having at its front end an arm at its top and at its base projecting forward, a drill-block pivoted to swing laterally on said arms, means for automatically oscillating the drill-block upon its suspending pivot bearings, drills carried by the block the upper and the lowermost rows of drills respectively inclining upward and downward, reciprocatory hammers for actuating the drills, and fluid connections for actuating said hammers.

34. In a tunnel driving machine, and in combination, a car, a block pivoted to the car at the front thereof, drills carried by and projecting from the front of the block, means for reciprocating the drills, coacting means carried by the block and the car and adapted to swing the block automatically and continually in reverse directions about its pivotal axis the means carried by the block adapted to make alternate contact with the means carried by the car.

35. In a tunnel driving machine and in combination, a car, a block pivotally mounted on the front thereof, drills carried by and projecting from the front of the block, means for reciprocating the drills, a shaft from which power for the oscillation of the block is derived and arranged in alinement with the pivot mounting of said block, means actuated by said shaft to automatically swing the drill-block in continuous reverse directions including the bevel gear 22 on said shaft, the clutch-gear 23—24 the worm-gear 25, the slidable rod 27, its pin 28, and the segmental rack having the arms 27—39 adapted to make alternate contact with the pin 128, and means for causing the car to advance in the cutting operation.

36. In a tunnel driving machine, a car having an arm at the top and at the bottom projecting in front thereof, a drill-block pivotally mounted mediately of its width upon said arms, a pair of supporting rollers mounted at the base of said block in advance of the pivot mounting thereof and arranged to travel in the arc of a circle described by the oscillations of said drill-block, means for automatically and continuously oscillating said drill-block and means for causing the car to advance in the cutting operation.

37. In a tunnel driving machine and in combination, a car, a pivotally mounted block at the front of the car, means for oscillating the block, drills carried by said block, an air compressor, flexible conduits connecting the latter with the block for operating the drills during the swing movements of the block, and means whereby the car is caused to advance.

38. A tunnel driving machine comprising in coöperative organization the following instrumentalities a car, a block, drills arranged in groups within said block, means for pivotally mounting said block upon the car, means whereby the drills are actuated by compressed air in groups which alternate in striking a thrusting blow, means for horizontally oscillating the drill carrying block as the car advances, means for limiting the oscillations of the drill-block, power driven means for causing the car to advance, means for guiding the car in its tunnel driving course, and for holding the car in a determined position, and rolling supports for the drill-carrying block.

39. In a tunnel driving machine, a car, and means for advancing it against the breast of the tunnel, a drill-block carried in front of the car, a pair of arms pivoted to each side of the car, a roller carried by each arm at its outer end, and means for adjusting the roller ends of the arms toward and from the car consisting of a screw-rod pivoted to each arm, a sleeve for each screw-rod pivotally mounted on the car and adapted to slidingly support the screw-rod, and a nut engaging the screw-rod and swiveled in the sleeve and adapted to adjust said screw-rod in the sleeve and to secure the rod in an adjusted position.

40. A car, a pair of arms, pivoted to each side, a roller carried by each arm at its outer end, a screw-threaded rod pivoted to each arm, a sleeve for each screw threaded rod the sleeve being pivotally mounted on the car and adapted to slidingly support the screw-threaded-rod, and a nut engaging the threaded rod and swiveled to the sleeve and adapted to slide the threaded rod in the sleeve and to secure the rod in an adjusted position.

41. In a tunnel driving machine, a car, a block pivoted thereon, thrusting drills carried by the block, means for changing the horizontal angle of the drill-block with reference to the line of travel of the car, and arms adjustably mounted on each side of the car and having roller bearings adapted to be adjusted to maintain the roller bearings in engagement with the sides of the tunnel for the lateral adjustment of the car at either end and for guidance of the car and for holding it in position in the tunnel.

42. In a tunnel driving machine, a car, a block pivoted thereon, thrusting drills carried by the block, means for changing the horizontal angle of the drill-block with reference to the line of travel of the car, and means adjustably mounted on each side of the car for its guidance and for holding it in position in the tunnel and consisting of arms coupled together in pairs and pivotally secured at their meeting ends at each side of the car, the outer end of each arm having a roller, a screw-rod pivoted to each arm near its roller end and a universal joint connecting the screw-rod to the side of the car.

43. In a tunnel driving machine, a car, a block pivotally mounted thereon, thrusting drills carried by the block, a muck-pan suspended from and beneath the block, and means connecting it to the pan for causing it to have a reciprocating movement.

44. In a tunnel driving machine, and in combination, a car, and means for advancing it against the breast of the tunnel, a drill-head carried in front of the car, and arms pivotally mounted at each side of the car extending therefrom obliquely to the front and to the rear, and each having roller bearings adapted to engage the side walls of the tunnel, and means for adjusting said arms for the purpose stated.

In testimony whereof I have signed my name to this specification in the presence of two subscribing witnesses, March 4th, 1907.

GEORGE ALLEN FOWLER.

Witnesses:
HENRY KNEISEE,
EMIL HENDERSON.